US012606250B2

(12) United States Patent
Peron et al.

(10) Patent No.: US 12,606,250 B2
(45) Date of Patent: Apr. 21, 2026

(54) FRONT STRUCTURE OF A MOTOR VEHICLE COMPRISING AN UPPER CROSS-MEMBER AND VEHICLE COMPRISING SUCH A FRONT STRUCTURE

(71) Applicant: PSA AUTOMOBILES SA, Poissy (FR)

(72) Inventors: Rodolphe Peron, Herblay (FR); Thibault Gourvennec, Draveil (FR); Xavier Michel, Pontault Combault (FR); Guillaume Royer, Bruyeres le Chatel (FR)

(73) Assignee: Stellantis Auto SAS, Poissy (FR)

( * ) Notice: Subject to any disclaimer, the term of this patent is extended or adjusted under 35 U.S.C. 154(b) by 375 days.

(21) Appl. No.: 18/262,072

(22) PCT Filed: Dec. 14, 2021

(86) PCT No.: PCT/FR2021/052324
§ 371 (c)(1),
(2) Date: Jul. 19, 2023

(87) PCT Pub. No.: WO2022/162287
PCT Pub. Date: Aug. 4, 2022

(65) Prior Publication Data
US 2024/0300585 A1     Sep. 12, 2024

(30) Foreign Application Priority Data
Jan. 28, 2021     (FR) ...................................... 2100827

(51) Int. Cl.
B62D 25/08 (2006.01)
B60R 19/12 (2006.01)
(52) U.S. Cl.
CPC ............ B62D 25/085 (2013.01); B60R 19/12 (2013.01)

(58) Field of Classification Search
CPC ............................ B62D 25/084; B62D 25/085
(Continued)

(56) References Cited

U.S. PATENT DOCUMENTS

| | | | | |
|---|---|---|---|---|
| 7,419,208 B2 * | 9/2008 | Sub | ...................... | B62D 29/001 |
| | | | | 296/193.09 |
| 8,167,361 B2 * | 5/2012 | Riviere | ................ | B62D 29/001 |
| | | | | 296/203.02 |

(Continued)

FOREIGN PATENT DOCUMENTS

| | | | | |
|---|---|---|---|---|
| DE | 102005039469 A1 * | 2/2007 | ........... | B62D 25/084 |
| EP | 1266818 B1 | 8/2006 | | |

(Continued)

OTHER PUBLICATIONS

International Search Report for corresponding PCT/FR2021/052324 mailed Apr. 4, 2022.

(Continued)

*Primary Examiner* — Jason S Morrow
(74) *Attorney, Agent, or Firm* — Sandberg Phoenix & von Gontard, PC

(57) ABSTRACT

The invention relates to a front structure (1) of a motor vehicle, comprising: —two longitudinal structural beams (10) having a generally elongate shape in a direction parallel to the longitudinal axis (X) of the vehicle; —two deformation boxes (14), each deformation box (14) being rigidly attached to one of the longitudinal structural beams (10), respectively; —an upper cross-member (18), the upper cross-member (18) comprising a cross-member element (180) that extends along a transverse axis (Y) of the vehicle, the cross-member element (180) being attached to the rest of the front structure (1) by means of two attachment brackets (182), each attachment bracket (182) being sandwiched (Continued)

between the corresponding longitudinal structural beam (10) and the deformation box (14), respectively.

6 Claims, 3 Drawing Sheets

(58) Field of Classification Search
USPC ............... 296/187.09, 187.1, 193.09, 203.02
See application file for complete search history.

(56) References Cited

U.S. PATENT DOCUMENTS

| | | | | |
|---|---|---|---|---|
| 8,308,225 | B2 * | 11/2012 | Owen | .................... B62D 27/04 |
| | | | | 296/203.02 |
| 2001/0038231 | A1 * | 11/2001 | Takemoto | ............ B62D 21/157 |
| | | | | 296/187.09 |
| 2010/0080013 | A1 * | 4/2010 | Riviere | ................ B62D 25/084 |
| | | | | 362/523 |
| 2011/0221213 | A1 * | 9/2011 | Riviere | ................ B62D 25/084 |
| | | | | 293/132 |
| 2024/0109597 | A1 * | 4/2024 | Peron | .................... B62D 25/085 |

FOREIGN PATENT DOCUMENTS

| | | | | | |
|---|---|---|---|---|---|
| EP | 2949518 | B1 | | 6/2017 | |
| FR | 2919567 | A1 | * | 2/2009 | ........... B62D 21/152 |
| KR | 20200128922 | A | * | 11/2020 | ........... B62D 25/085 |
| WO | 2020008123 | A1 | | 1/2020 | |

OTHER PUBLICATIONS

Written Opinion for corresponding PCT/FR2021/052324 mailed Apr. 4, 2022.

* cited by examiner

[Fig. 1]
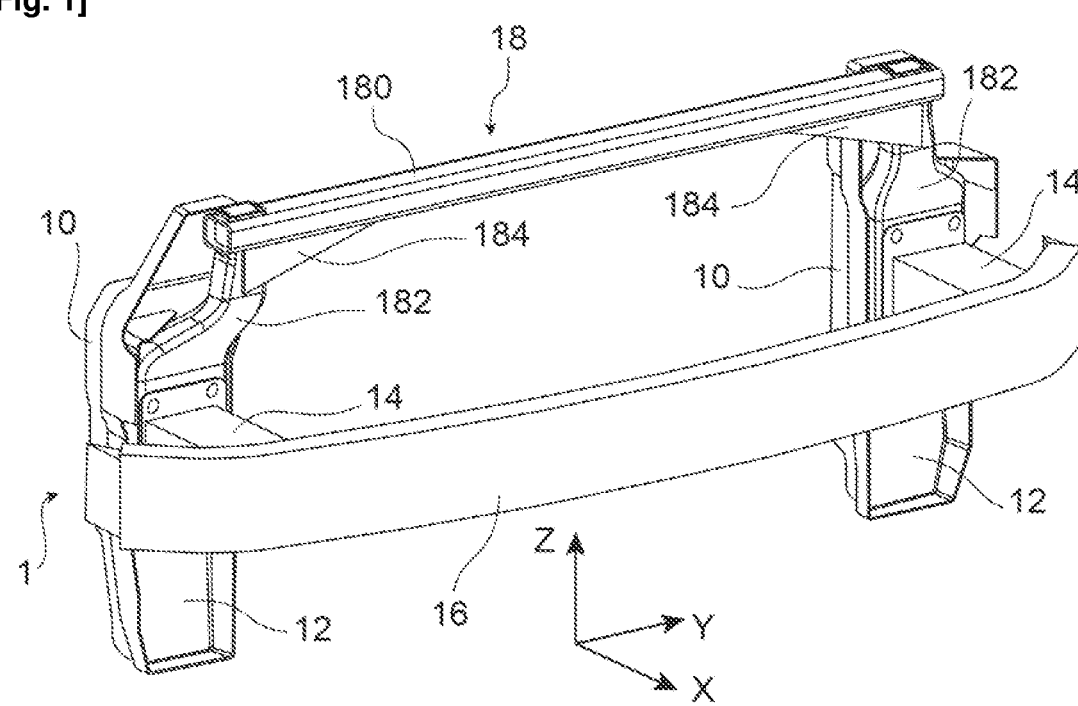
[Fig. 2]
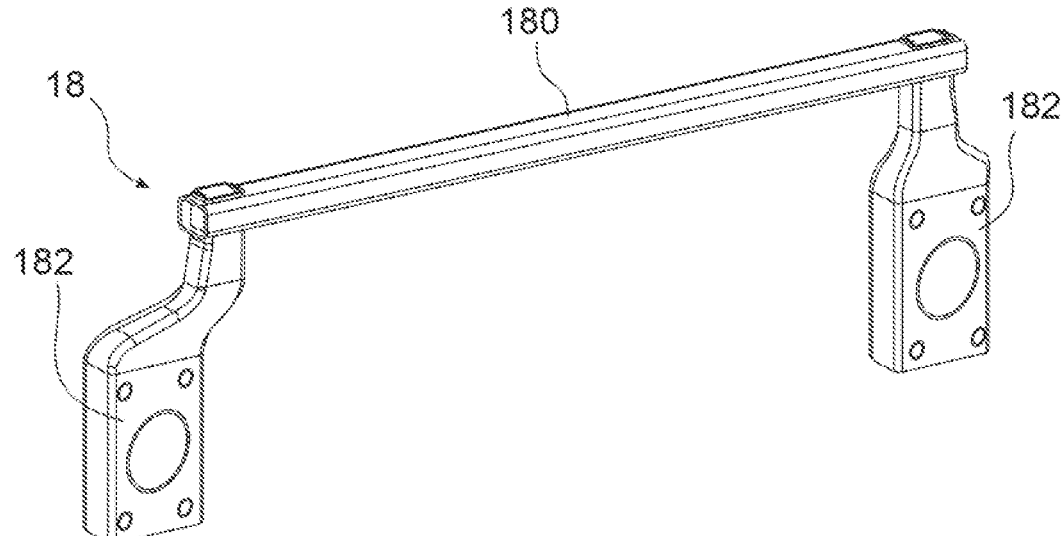

[Fig. 5]
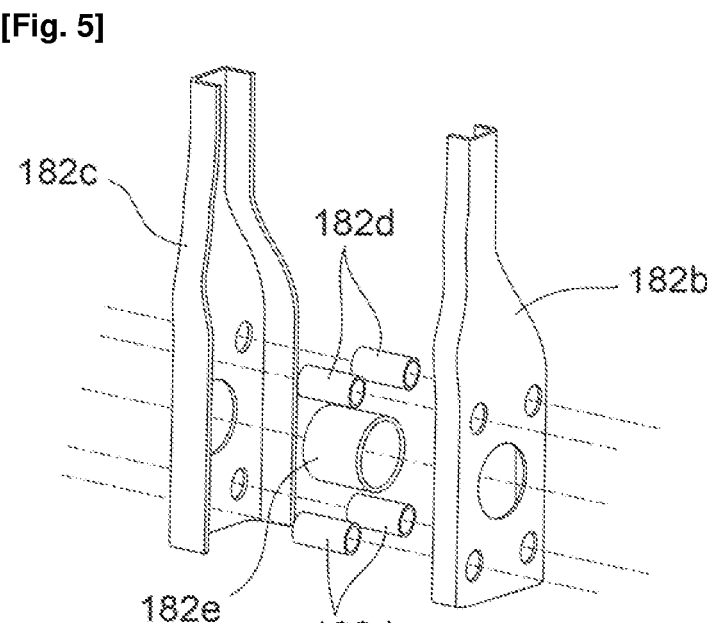

FRONT STRUCTURE OF A MOTOR VEHICLE COMPRISING AN UPPER CROSS-MEMBER AND VEHICLE COMPRISING SUCH A FRONT STRUCTURE

CROSS-REFERENCE TO RELATED APPLICATIONS

This application is the US National Stage under 35 USC § 371 of International Application No. PCT/FR2021/052324, filed Dec. 14, 2021, which claims the priority of French application 2100827 filed on Jan. 28, 2021, the content (text, drawings and claims) of both said applications being incorporated by reference herein.

BACKGROUND

The devices disclosed herein relate to the field of motor vehicles, and more particularly relates to the deformation behavior of the structure of the motor vehicles in the event of a small overlap front impact. Small overlap frontal impacts, that is to say with an overlap of less than 25% between a fixed obstacle and the front end of a motor vehicle, take an increasingly important place in the context of the test protocols carried out within government or non-government agencies. The purpose of these tests is to verify compliance with the standards in force in each country, in particular concerning the repercussions of impacts on vehicles and their occupants.

In order for the structure of a vehicle to be able to deform with the best possible effectiveness during a small overlap frontal impact, the front structure of a motor vehicle generally comprises two longitudinal structural beams, commonly called "beams", extended at the front by two deformable boxes in case of impact, commonly called "crash boxes". Between each beam and each deformable box, there is generally an element called a front support. It is also known to provide an upper cross-member connecting the front supports, making it possible to rigidify the front structure of the vehicle, thus avoiding deformation of the beams during a small overlap frontal impact.

SUMMARY

An object is to propose a motor vehicle front structure comprising an improved upper cross-member.

To this end, disclosed herein is a motor vehicle front structure, comprising:

two longitudinal structural beams, having a generally elongate shape in a direction parallel to the longitudinal axis of the vehicle;

two deformation boxes, each deformation box being rigidly attached to one of the longitudinal structural beams, respectively;

an upper cross-member, the upper cross-member comprising a cross-member element that extends along a transverse axis of the vehicle, the cross-member element being attached to the rest of the front structure by means of two attachment brackets, each attachment bracket being sandwiched between the corresponding longitudinal structural beam and the deformation box, respectively.

Thus, by providing an upper cross-member whose attachment brackets are sandwiched between the front ends of the longitudinal structural beams (or front beams) and the deformation boxes, the upper cross-member can be very easily integrated into an existing structure, for example to adapt the latter to the requirements of a country where the small overlap frontal impact strength is required for approval. Indeed, no modification of the various elements used for attaching the deformation boxes is required. It is therefore possible to provide an upper cross-member on a front structure without requiring significant modifications to the pre-existing parts.

In one embodiment, each longitudinal structural beam is rigidly attached, at a front end, to a support element, each attachment bracket being sandwiched respectively between the corresponding support element and deformation box.

In one embodiment, each attachment bracket of the upper cross-member comprises through openings, the openings allowing the passage of fastening elements, such as screws, for fastening the corresponding deformation box onto the corresponding support element.

In one embodiment, each attachment bracket is made by assembling two half-shells between which tubular elements are interposed for the passage of the fastening elements of the deformation boxes, the tubular elements being opposite the openings.

In one embodiment, an anti-crushing element is interposed between the two half-shells, for example a metal element of tubular shape.

In one embodiment, the cross-member element is rigidly attached to each of the attachment brackets by welding.

In one embodiment, a reinforcing element, such as a reinforcing plate, is provided at the junction between each attachment bracket and the cross-member element.

In one embodiment, the front structure comprises a transverse beam rigidly attached to each of the deformation boxes.

The devices disclosed herein also relate to a motor vehicle comprising a front structure according to the one defined above.

The present disclosure will be better understood on reading the following detailed description, given with reference to the appended drawings.

BRIEF DESCRIPTION OF THE FIGURES

FIG. 1 is a partial perspective view of a front structure of a motor vehicle, the vehicle comprising an upper cross-member.

FIG. 2 is a perspective view of an upper cross-member.

FIG. 3 is a detail view of FIG. 2.

FIG. 4 is a perspective view of an attachment bracket of the upper cross-member of FIG. 2.

FIG. 5 is an exploded view of the attachment bracket of FIG. 4.

DETAILED DESCRIPTION

FIG. 1 is a partial perspective view of a front structure 1 of a motor vehicle. The front structure 1 of the vehicle comprises two longitudinal structural beams, or front beams 10. Only the front ends of the beams 10 are visible in FIG. 1. The beams 10 generally extend in a direction parallel to the longitudinal axis X of the motor vehicle, thus enclosing a certain number of elements of the vehicle, including the powertrain (not shown).

At the front end of each beam 10 is attached a support element 12, or front support 12, used in particular for the fastening of a respective deformation box 14, able to deform in case of impact, and more particularly in the event of a frontal impact. The deformation boxes 14 are connected together by a transverse beam 16, commonly referred to as bumper beam.

The front structure 1 further comprises an upper cross-member 18, visible in particular in FIGS. 1 and 2. The upper cross-member 18 is rigidly attached to each of the front supports 12. More specifically, the upper cross-member 18 comprises a cross-member element 180, extending in a direction parallel to the transverse axis Y of the vehicle, and connected to each front support 12 by means of a respective attachment bracket 182. Each attachment bracket 182 is sandwiched between the front support 12 and the corresponding deformation box 14.

Figures 3, 4:
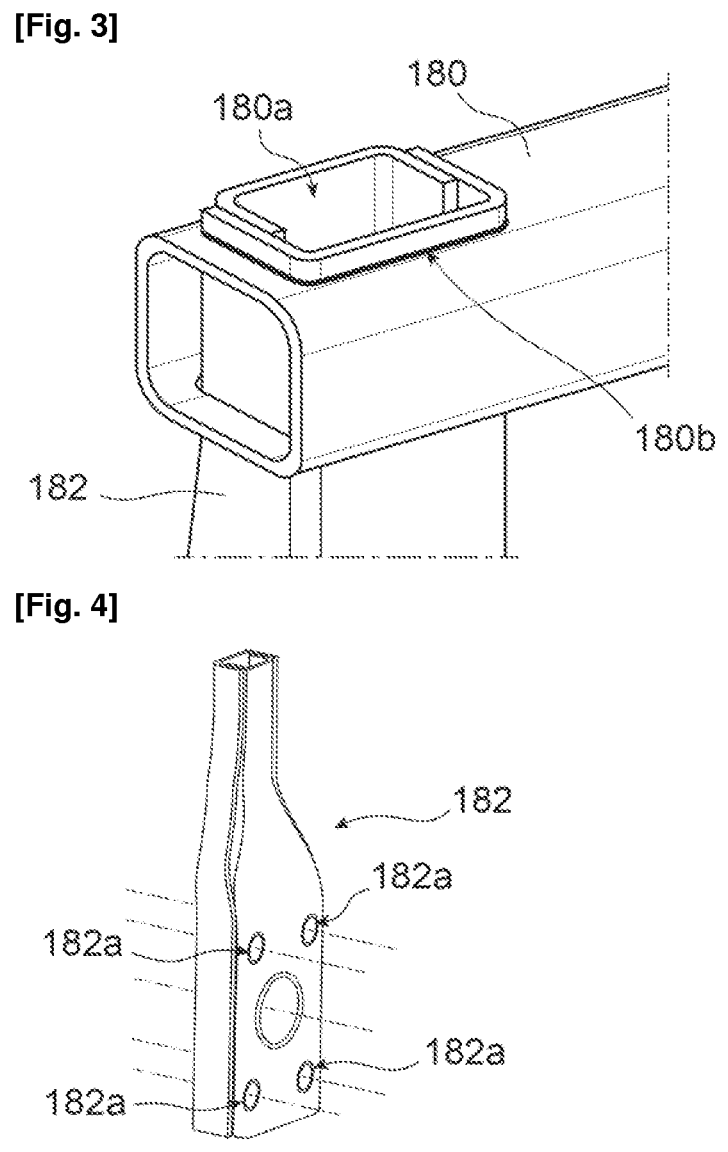

Advantageously, the upper cross-member 18 is made by assembling metal elements, in particular by welding. For example, as can be seen in FIG. 3, each attachment bracket 182 of the upper cross-member 18 comprises an upper end that is inserted into a through opening 180a provided in the cross-member element 180. Each attachment bracket 182 can thus be attached to the cross-member element 180 by means of a first weld bead 180b, disposed at an upper surface of the cross-member element 180, and a second weld bead (not visible in the figures), disposed at a lower surface of the cross-member element 180. Advantageously, as can be seen in FIG. 1, a reinforcing element 184, such as a reinforcing plate, can be provided at the attachment of each fastening foot 182 to the cross-member element 180.

Advantageously, as can be seen in FIG. 4, in order to attach each attachment bracket 182 of the upper cross-member 18, each attachment bracket 182 comprises through openings 182a that enable the passage of the various fastening elements (such as screws, threaded rods, etc.) used for fastening the transverse beam 16 and each deformation box 14 on the corresponding front support 12.

Advantageously, as can be seen in FIG. 5, each attachment bracket 182 is made by assembling metal elements, in particular by welding. In the example of FIG. 5, each attachment bracket is made by assembling two half-shells 182b, 182c, between which tubular elements 182d are interposed for the passage of the fastening elements of the transverse beam 16 and deformation boxes 14. Thus, the tubular elements 182d are arranged opposite the openings 182a. Advantageously, an anti-crushing element 182e is also interposed between the two half-shells 182b, 182c, such as a metal element of tubular shape. The anti-crushing element 182e makes it possible to prevent or at least drastically limit the crushing of the attachment bracket 182 in the event of a frontal impact.

The upper cross-member 18 makes it possible to optimize the deformation of the front structure in the event of a small overlap frontal impact by improving the lateral rigidity of the entire front structure 1. Thus, in the event of a small overlap frontal impact against an obstacle, the upper cross-member 18 makes it possible to avoid excessive imbalance between the elements located on the side of the obstacle and those located on the opposite side. In particular, the upper cross-member 18 makes it possible to make both deformation boxes 14 deform during the impact, and not just the deformation box 14 located on the side of the obstacle. It is therefore understood that the behavior of the front structure 1 during a frontal impact, in particular a small overlap frontal impact, is improved, along with the safety of the vehicle occupants.

The invention claimed is:

1. A front structure of a motor vehicle, comprising:
two longitudinal structural beams, having a generally elongate shape in a direction parallel to the longitudinal axis of the vehicle;
two deformation boxes, each deformation box being rigidly attached to one of the longitudinal structural beams, respectively;
an upper cross-member, the upper cross-member comprising a cross-member element that extends along a transverse axis of the vehicle, the cross-member element being attached to the rest of the front structure by means of two attachment brackets, each fastening bracket being sandwiched between the corresponding longitudinal structural beam and the deformation box, respectively:
wherein
each longitudinal structural beam is rigidly attached, at a front end, to a support element, each attachment bracket being sandwiched between the support element and the corresponding deformation box, respectively;
each attachment bracket of the upper cross-member comprises through openings, the openings allowing the passage of fastening elements for the fastening of the corresponding deformation box onto the corresponding support element; and
each attachment bracket is made by assembling two half-shells, between which tubular elements are interposed for the passage of the fastening elements of the deformation boxes, the tubular elements being opposite the openings.

2. The front structure according to claim 1, wherein an anti-crushing element is interposed between the two half-shells.

3. The front structure according to claim 1, wherein the cross-member element is rigidly attached to each of the attachment brackets by welding.

4. The front structure according to claim 3, wherein a reinforcing element is provided at the junction between each attachment bracket and the cross-member element.

5. The front structure according to claim 1, comprising a transverse beam rigidly attached to each of the deformation boxes.

6. A motor vehicle comprising a front structure according to claim 1.

* * * * *